United States Patent [19]

Ban et al.

[11] 4,031,556

[45] June 21, 1977

[54] MODE CHANGEOVER APPARATUS FOR RECORDER/PLAYER

[76] Inventors: Itsuki Ban, 829, Higashioizumi, Nerima, Tokyo; Kazunori Mochizuki, 6673 Oazahodaka, Hodaka-cho, Minamiazumi, Nagano, both of Japan

[22] Filed: Apr. 14, 1976

[21] Appl. No.: 676,892

[30] Foreign Application Priority Data

Apr. 14, 1975  Japan ............................... 50-44270
May 2, 1975  Japan ............................... 50-52520
June 26, 1975  Japan ............................... 50-78640

[52] U.S. Cl. .................................. 360/96; 242/199; 360/74; 360/105
[51] Int. Cl.² ................. G11B 15/10; G11B 15/24; G11B 15/44; G11B 23/04
[58] Field of Search ................ 360/96, 93, 90, 105, 360/74; 242/199–200

[56] References Cited

UNITED STATES PATENTS

| | | | |
|---|---|---|---|
| 3,305,187 | 2/1967 | Atsumi | 360/96 |
| 3,609,844 | 10/1971 | Ichikawa | 360/96 |
| 3,653,669 | 4/1972 | Sterly | 360/92 |
| 3,747,941 | 7/1973 | van der Lely | 360/96 |
| 3,834,651 | 9/1973 | Hashizume | 360/96 |
| 3,887,943 | 6/1975 | Katsurayama | 360/96 |
| 3,940,792 | 2/1976 | Herleth | 360/96 |

*Primary Examiner*—Alfred H. Eddleman
*Attorney, Agent, or Firm*—Lane, Aitken, Dunner & Ziems

[57] ABSTRACT

In a mode changeover apparatus for a magnetic recorder/player having a plurality of push-buttons for directing changeover of tape drive modes, a simple and compact mechanism for effecting mode changeover including an eccentric idler, a restraining mechanism, a locking mechanism, an engaging mechanism a locking member, a lever, a releasing mechanism and a holding mechanism. The idler is mounted on a slidable support, and can be rotated through a capstan wheel which is driven by a motor. The support carries a magnetic head, and can be moved by the rotation of the idler. The restraining mechanism restrains the support to a reproduction position. The support is moved to a non-reproduction position through the engaging mechanism and is locked there by the locking mechanism. The releasing mechanism releases the support from the non-reproduction locking. The idler is locked to a state that its smallest radius portion confronts the capstan wheel by the locking member. A small gap can be left between this smallest radius portion and the capstan wheel by the holding mechanism. The idler can be brought into rotating relationship with the capstan wheel by the lever which temporarily releases locking engagement for the idler.

Alternatively, a slidable bar, a lever pivoted to an end of the bar, electric switches and a control circuit for a motor are provided. One of the switches is operated by the movement of the bar to shut off and allow current supply for the motor. The other switches are operated by the movement of the lever to control the rotational direction and speed of the motor through the control circuit.

28 Claims, 12 Drawing Figures

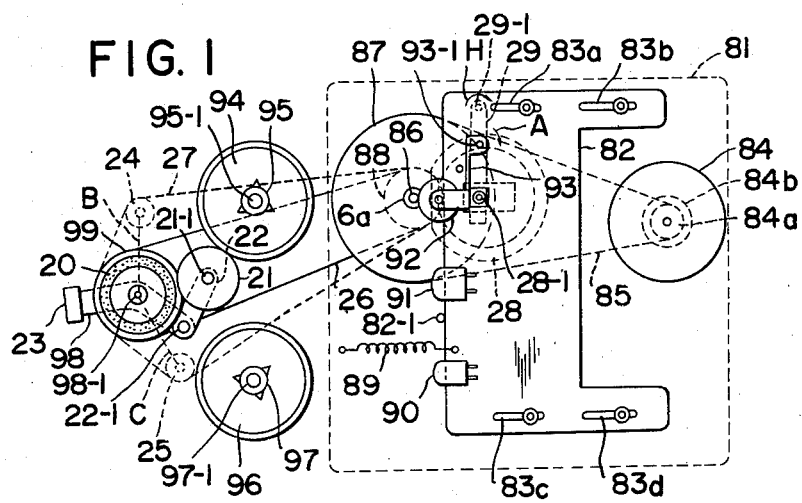

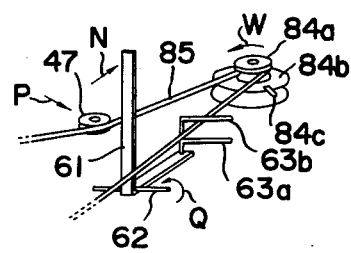
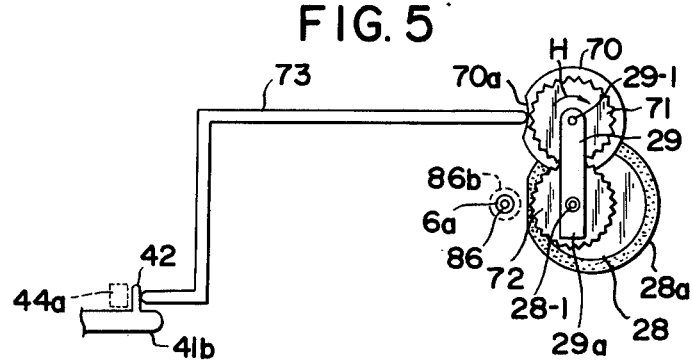

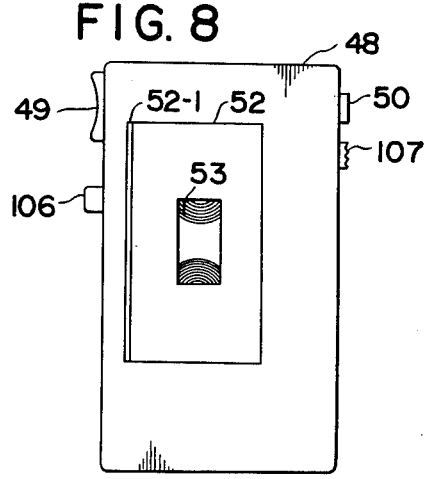
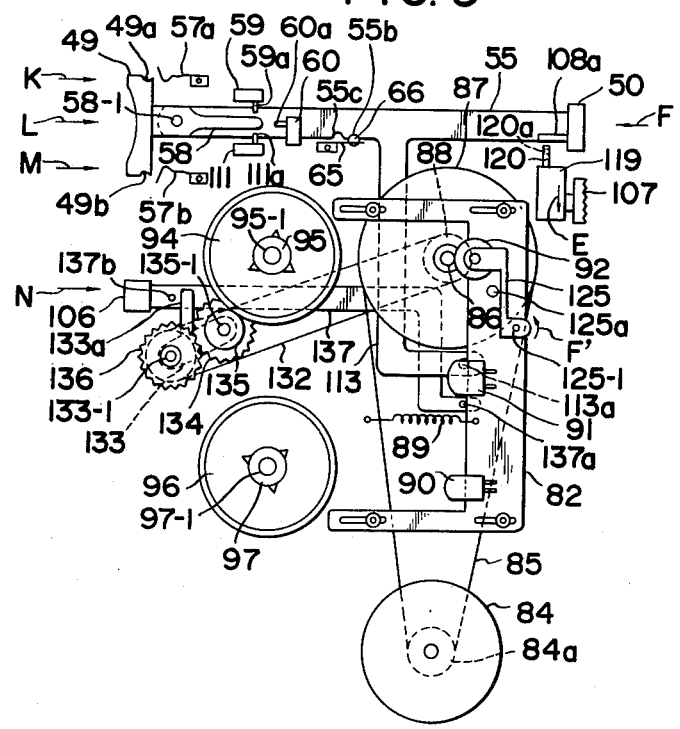

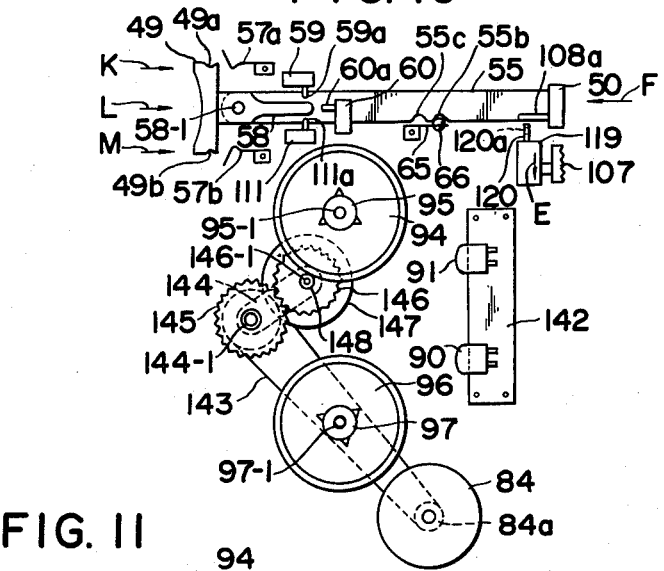
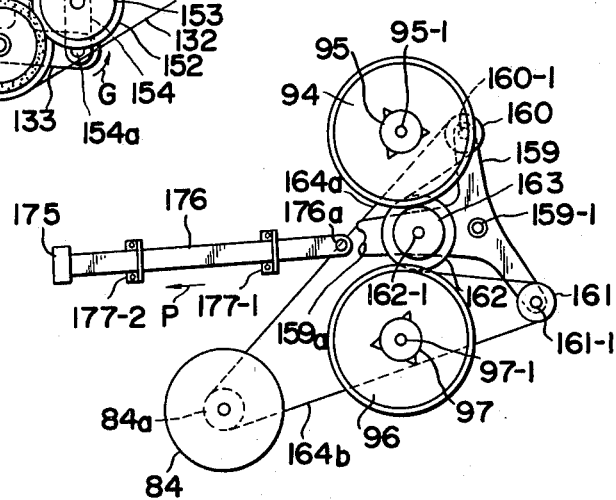

MODE CHANGEOVER APPARATUS FOR RECORDER/PLAYER

BACKGROUND OF THE INVENTION

This invention relates to a magnetic recording/reproducing apparatus, and more particularly to an improved apparatus to effect the changeover between tape-drive modes such as stop, recording/reproducing, fast-feed, and rewind for a cassette-contained magnetic tape.

In a prior art mode changeover apparatus wherein mode changeover is performed by depressing push-buttons, a support carrying a magnetic head and a pinch roller is moved into and out of contact with a cassette directly by the force of depressing push-buttons. In this way, changeover is directed between modes against both the force of springs which bias working parts and the resistive friction between working parts. Accordingly, a relatively great force is required for depressing the push-buttons.

The springs in the prior art apparatus must be strong for insuring that the mode is changed over and are one of the major reasons why the push-buttons are so hard to operate when compared with, for example, electric push-buttons. Further, in the prior art apparatus a relatively large stroke of movement of push-buttons is required at the time of mode changeover.

Thus, the prior art apparatus does not lend itself to be used in a magnetic recording/reproducing apparatus which is small in size and easy to handle, such as a "one-hand" type of magnetic recording/reproducing apparatus which can be held in one hand and the operation of push-buttons can be performed with the fingers of that hand. Other disadvantages of the prior art apparatus include a relatively loud noise which accompanies the operation of mode changeover and the problem of working parts wearing away relatively soon.

SUMMARY OF THE INVENTION

The above-described drawbacks in the prior art apparatus have been successfully eliminated by the present invention. According to the invention, mode changeover can be performed by applying a small force to push-buttons, with significantly less mechanical noise and wear of working parts. Further, the apparatus can be made much smaller in size and easier to handle because with the above improvements it can be formed into a one-hand type of apparatus.

Accordingly, an object of the invention is to provide a magnetic recording/reproducing apparatus wherein mode changeover can be performed by applying a small force to push-buttons.

Another object of the invention is to provide a magnetic recording/reproducing apparatus wherein mechanical noise and wearing away of working parts are significantly reduced.

A further object of the invention is to provide a magnetic recording/reproducing apparatus of one-hand type which is small in size and easy to handle.

A still further object of the invention is to provide a magnetic recording/reproducing apparatus wherein the pose mode is easily established.

The above and other objects and advantages of the invention will be apparent from the following description taken in conjunction with the accompanying drawings.

BRIEF DESCRIPTION OF THE DRAWINGS

FIG. 1 is a plan view illustrating the mechanism used for driving a magnetic tape and effecting mode changeover according to the invention;

FIG. 2 is a side view of the construction about the capstan in the mechanism of FIG. 1;

FIG. 3 is a plan view illustrating an embodiment incorporating the mechanism of FIG. 1;

FIG. 4 is a perspective view illustrating a mechanism for switching between normal-speed and high-speed drives in the apparatus of the invention;

FIG. 5 is a plan view illustrating an embodiment of the mechanism for switching between forward and reverse drives of the motor adapted for use in the apparatus of the invention;

FIG. 8 is a plan view of the exterior of still another embodiment of apparatus of the invention;

FIG. 9 is a plan view illustrating the internal construction of the embodiment of FIG. 8;

FIG. 10 is a plan view illustrating an alternative internal construction for the construction of FIG. 9;

FIG. 11 is a plan view illustrating another embodiment of reel-stand driving mechanism; and FIG. 12 is a plan view illustrating a mechanism for pose mode in the apparatus of the invention.

DESCRIPTION OF THE PREFERRED EMBODIMENTS

Figure 6:
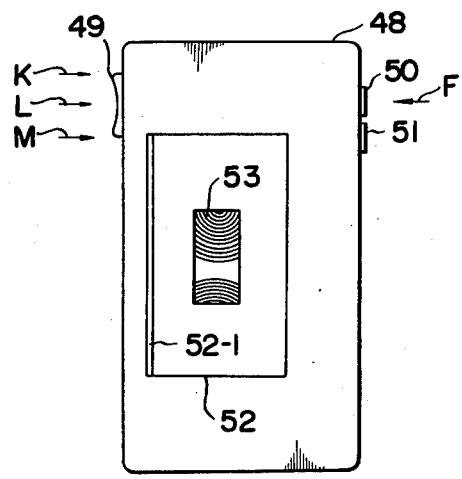
FIG. 6 is a plan view of the exterior of another embodiment of apparatus of the invention.

Referring to FIG. 1, a mechanism for driving a magnetic tape contained in a cassette and for effecting mode changeover will be described in detail. A capstan 86 is provided on a deck 81 shown by dotted line in the main body of a recorder. A support plate 82 is provided also on the deck 81 in a manner such that the plate can slide to the right and left between the extremities of guide slots 83a, 83b, 83c, 83d, provided therein. The support plate 82 carries a magnetic head 91 and an erase head 90, and is elastically biased leftward, as shown in FIG. 1, by a spring 89. A lever 93, supported by a shaft 93-1 which in turn is mounted on the support plate 82, carries at its free and a pinch roller 92 at the right side of the capstan 86. The lever 93 is elastically biased clockwise (as shown by arrow A) by a spring (not shown). Thus, the pinch roller 92 is adapted to press a magnetic tape against the capstan 86 to drive the tape by rotation of the capstan.

Referring now to FIG. 2, the construction about the capstan 86 will be described in detail. The capstan 86, which is rotatably supported by a bearing 86a fixed to the deck 81, carries a flywheel 87, and pulleys 87a, 88, all of which are fixed to the lower end of the capstan. A lever 29, which is supported by a shaft 29-1 (FIG. 1) and mounted on the back side of the deck 81, is elastically biased clockwise (as shown by arrow H) by a light spring (not shown). An eccentric idler 28 is rotatably supported through a shaft 28-1 by a bearing 28a fixed to the free end of the lever 29. The shaft 28-1 loosely protrudes through a hole 82a provided in the support plate 82 to form an engaging means. The bearing 28a freely passes through a hole 81a provided in the deck 81 so that the bearing may move to the right and left to a degree of extent in this hole. The hole 28a, as will be described hereinbelow, is for the purpose of moving the support plate 82 to the right and left, and has a predetermined clearance about the shaft 28-1. The idler 28 is adapted to come into and out of contact with a cylinder wheel 86b which is integrally and concentrically formed to the upper surface of the flywheel 87 and serves as the capstan power means.

In FIG. 1, a stop pin 82-1 or restraining means is mounted on the deck 81 to limit leftward movement of the support plate 82. Reel-stands 95, 97, are rotatably supported respectively by shafts 95-1, 97-1, which are mounted on the body of the recorder, and have reel-stands 94, 96, integrally formed thereto, respectively. A DC motor 84 is fixed to the deck 81. A pulley 84a is fixed to the rotating shaft of the motor 84 and is operatively connected with the pulley 87a (FIG. 2) by means of a drive belt 85. To the shaft of the motor 84 is also fixed a pulley 84b, the function thereof being described hereinbelow in connection with FIG. 4.

Referring now to FIG. 1, a mechanism for driving the reel-stands 94, 95, will be described. A lever 98, a pulley 99, and a wheel 20 are rotatably supported by a shaft 98-1 which is mounted on the bottom of the body. The wheel 20 and the pulley 99 are connected to each other in a frictionally engaging relationship through a slip mechanism (not shown) and are rotatable independently of the lever 98. A lever 22 is rotatably supported on one free end of the lever 98 through a connecting pin 22-1, and carries on its free end wheel 21 through a shaft 21-1. The levers 22 and 98 are elastically biased toward each other by a spring (not shown) so that the wheel 21 may be pressed against a rubber ring provided around the periphery of the wheel 20. The pulleys 99 and 88 are operably connected to each other by means of a drive belt 26. The reel-shafts 95, 97, fit to the hubs in a cassette (not shown) which is mounted on the upper part of the recorder.

FIG. 1, as shown, depicts the recorder in the recording/reproducing state, i.e., the magnetic head 91 is in contact with the magnetic tape and the support plate 82 occupies a position wherein the pinch roller 92 presses the tape against the capstan 86 to drive the tape at a normal speed. When the support plate 82 moves rightward, the magnetic head 91 and the pinch roller 92 depart away from the tape, thus terminating the recording/reproducing, and the plate 82 assumes a non-reproduction position.

In the recording/reproducing mode shown in FIG. 1, the capstan 86 rotates counterclockwise, causing the pulley 99 and wheel 20 to rotate counterclockwise. Consequently, due to rotational friction between the lever 98 and the wheel 20, the lever 98, together with the lever 22, is driven counterclockwise to press the wheel 21 lightly against the rubber ring around the reel-stand 94 and also against the wheel 20 on the other side. The wheel 21 is rotated clockwise through the counterclockwise rotation of the wheel 20, and accordingly the reel-stand 94 is rotated counterclockwise, thus taking up the magnetic tape through the reel-shaft 95.

When the load on the reel-stand 94 increases, the counterclockwise torque to the levers 98, 22, is increased which causes the pressing force of the wheel 21 against the reel-stand 94 to increase proportionally so that the drive force transmitted to the reel-stand is greater, insuring accurate rotation. The mechanism just described is advantageous because the driving power required for initially bringing the wheel 21 into contact with the reel-stand 94 may be small because the wheel 21 presses against the wheel 20 and the reel-stand 94 in a wedging angle relationship. This wedging angle arrangement will not affect the switching operation to the rewind mode (described below) because when rotation of the motor 84 is reversed, the pulley 99 and the wheel 20 begin to rotate clockwise and the wheel 21 is rotated counterclockwise. This results in a relief angle relationship between the wheel 21 and the reel-stand 94 such that disengagement of the wheel 21 from the reel-stand 94 is easy to accomplish.

When rotation of the motor 84 is reversed, the levers 98 and 22 swing clockwise, which causes the wheel 21 to move away from the reel-stand 94 and into contact with a rubber ring provided around the periphery of the reel-stand 96. When this occurs, the pulley 99 and the wheel 20 rotate clockwise and the wheel 21 rotates counterclockwise as described above. The pressing contact of the wheel 21 against the reel-stand 96 is in a wedging angle relationship, so that sufficient transmission of drive torque can be effected between them to cause rotation of the reel-stand 96. At this time, when a governor (not shown) for the motor 84 is rendered inoperative, the motor 84 and accordingly the reel-stand 96 rotate (clockwise) at a high speed to take up the magnetic tape on the reel-stand 96, thus effecting the rewind mode. During the rewind mode, the support plate 82 is disengaged from the cassette.

During the reproduction mode, the wheel 20 slips to a degree with respect to the pulley 99 through a conventional felt sheet slip mechanism (not shown).

When the support plate 84 is in its non-reproduction position and the motor 84 rotates forward at a relatively high speed, the magnetic tape is taken up on the reel-stand 94 through the reel-shaft 95, thus effecting fast-feed.

For the purpose of switching the swing direction of the levers 98, 22, between counterclockwise and clockwise directions in response to rotational directions of the pulley 88, levers B and C may optionally be formed integral with the lever 98. The levers B, C, carry on their respective free ends pulleys 24, 25, respectively. The pulleys 88, 24, 99, 25, are operatively connected with one another, in this order, by a drive belt 27. With this mechanism, torque for swinging the levers 98, 22, through the rotation of the pulley 88 will be increased.

A portable recorder can be constructed in various ways and be designed to include, for example, a clockwise or counterclockwise torque due to gravity acting on the levers 98, 22 (depending on the design of the recorder) and overcoming the drive torque applied by the drive belt 26. When this is the case, initial contact of the wheel 21 against the reel-stand 94 or 96 is ineffective. However, this problem can be solved by attaching a balancing weight 23 to the left-hand free end of the lever 98.

As will be understood from the above description, by selecting, in combination, the direction of movement (rightward or leftward) of the support plate 82, the rotational direction (forward or reverse) of the motor 84, and the rotating speed (high or low) of the motor 84, switching to a desired mode of stop, recording/reproducing, fast-feed or rewind can be effected.

Referring now to FIG. 3, an embodiment incorporating the mechanism of FIG. 1 will be described. Similar numerals indicate like parts as described above and no detailed description of them is necessary. The mechanism on the support plate 82 including the pinch roller 92 (as shown in FIG. 1) has been omitted from FIG. 3 for simplicity.

Referring now to FIG. 3, the support plate 82 is held at its recording/reproducing position, i.e., at its leftmost position limited by the stop pin 82-1 mounted on the deck 81. The free end 29a of the lever 29 abuts the right end of a lever 46 or a locking member so that the lever 29 is locked there and thus restrained from further clockwise rotation by the lever 46. The eccentric idler 28 confronts, at its minimum radius point, the capstan 86, leaving a small gap between the periphery of the idler 28 and that of the wheel 86b which rotates synchronously with the capstan 86 and serves as capstan power means (FIG. 2). The lever 46, supported at its central position by a shaft 46-1 which is mounted on the bottom of the body of recorder, is elastically biased counterclockwise (as shown by arrow J) by a light spring (not shown).

The arrangement just described shows the recorder in its recording/reproducing state, wherein the pinch roller 92 (FIG. 1) presses a magnetic tape against the capstan 86 to drive the tape, and the magnetic head 91 engages the tape. A lever 33 is rotatably supported at its central position on the deck 81 by a shaft 33-1. The lever 33 is also connected at the free end of its one arm 33b to a lever 32 by a connecting pin 32-1 so that each of the levers may swing with respect to the pin 32-1. A guide pin 31 which is mounted on the support plate 82 loosely protrudes through a slit formed in the free end of the lever 32. The levers 32, 33, are elastically biased by a spring (not shown) so that the lever 32 and the arm 33b may make a linear configuration, i.e., the lever 32 is elastically biased clockwise (as shown by arrow D) with respect to the pin 32-1.

A conventional alternative-selection mechanism, shown by the dotted line designated by reference numeral 39, includes a locking bar 39a and is positioned on the left side of the deck 81. The bar 39a has lock pins 46a, 46b, 46c, and 46d, mounted thereon and is slidable upward and downward and elastically biased downward by a spring 39b. The top portion 39c of the bar 39a is bent at a right angle and abuts the left end of the lever 46. Push-buttons 40a, 40b, 40c, and 40d, and connecting push-button rods 41a, 41b, 41c, and 41d, are positioned to slide to the right and left across the bar 39a and are elastically biased leftward by springs (not shown).

Each of the push-button rods 41a, 41b, 41c, and 41d, has a shoulder portion (step-shaped on the left side and sloped on the right side) for engaging a cooperating one of the lock pins 46a, 46b, 46c, and 46d. Upon rightward depression of any one of the push-buttons 40a, 40b, 40c, and 40d, the associated push-button rod is moved rightward and locked there through its shoulder portion by the corresponding lock pin of the bar 39a, and any other previously locked push-button rod is released from locking engagement with the lock pin of the bar 39a to return, together with its push-button, to the left so that alternative selective locking of the push-button rod is accomplished. With rightward movement of any one of the push-button rods, 41a, 41b, 41c, and 41d, the bar 39a, due to the engagement of the lock pin 46a, 46b, 46c or 46d, with the shoulder portion of the push-button rod, makes one up-and-down reciprocating movement, and accordingly the lever 46 makes one reciprocating swing. With the swing of the lever 46, the free end 29a of the lever 29 disengages from the right end of the lever 46, which causes the lever 29 to swing clockwise and press the eccentric idler 28 against the wheel 86b through a rubber ring 28c provided around the periphery of the idler 28. Since the wheel 86b serves as capstan power means and is rotating, the idler 28 begins to rotate.

With rotation of the idler 28, the lever 29 is driven counterclockwise to press the shaft 28-1 against the right-hand side of the hole 82a, and accordingly the support plate 82 is moved rightward (to the non-reproduction position). The force of the spring 89 is relatively small, but nonetheless aids the pressing contact between the idler 28 and the wheel 86b to prevent slip therebetween, thus making transmission of drive force certain. Upon about a half rotation of the idler 28, the lever 32 and the arm 33b of the lever 33 make a linear configuration. With additional rotation of a slight degree of the idler 28, the lever 32 and the arm 33b makes a slightly angled (generally linear) configuration in the direction opposite from their original position. The lever 32 and the arm 33b are kept in this configuration by abutting against a stop pin 34 which is mounted on the deck 81 and thus acts as locking means for keeping the support plate 82 at its rightward moved position through the guide pin 31. Dotted line Z shows the configuration of the levers 32, 33, at this time.

Upon still further rotation of the idler 28, the shaft 28-1 abuts the left-hand side of the hole 82a. With still further rotation of a slight degree, the idler 28 disengages from the wheel 86b and stops rotating. The support plate 82 is kept in its rightward moved position of non-reproduction. With the rightward movement of the support plate 82, electric switches 45, 30, are opened through their respective actuators 45a, 30a, which are depressed by the right-hand side of the support plate 82. The switch 45 renders the governor for the motor 84 inoperative to permit high-speed rotation of the motor. The switch 30 shuts off current supply to the motor 84. When the push-button rod 41d is moved rightward by the depression of the push-button 40d and is locked there by the alternative-selection mechanism 39, an electric switch 43 is depressed by the rod 41d and opens.

Accordingly, when the push-button 40d is depressed to effect swinging motion of the lever 46, this action causes the previously locked push-button rod 41a automatically to return to the left, the support plate 82 to move to its non-reproduction position, and the switches 43, 30 to open. The switches 43, 30, are connected in parallel and are interposed in the power supply source circuit so that when both the switches are open the power supply is shut off to effect the stop mode.

When the push-button 40c is depressed, the support plate 82 is moved to the right. The switch 45 permits high-speed rotation of the motor 84 while electric power is supplied from the source through the switch 43 even though the switch 30 is open. Consequently, the motor 84 and accordingly the capstan 86 rotate in the counterclockwise direction at a high speed, which causes the reel-stand 94 to rotate counterclockwise at a high speed, thus effecting the fast-feed mode.

When the push-button 40b is depressed, the support plate 82 is moved to the right, and a projection 42 formed on the push-button 41b depresses a changeover electric switch 44 which causes the motor 84 to rotate in the reverse or clockwise direction. The motor 4 rotates at a high speed because the switch 45 is depressed. Accordingly, the reel-stand 96 rotates clockwise at a high-speed, thus effecting the rewind mode.

The mechanism for driving the reel-stands 94, 96, and its operation have been described in connection with FIG. 1, and therefore the mechanism is omitted from FIG. 3 for simplicity. When the push-button 40b is depressed to move the push-button rod 41b to the right and lock it there, the motor 84 and accordingly the idler 28 rotate in reverse or clockwise direction. The support plate 82 can be moved to the right by either forward or reverse rotation of the idler 28 and be kept there by the levers 32, 33. Because of this feature, rotational direction of the idler 28 is not important in determining movement of the support plate 82.

Operation for changeover to the reproduction mode performed by depressing the push-button 40a will now be described concerning a case, for example, where the reproduction mode is effected by switching from stop mode. Upon depression of the push-button 40c, the push-button rod 41d, which has been moved to the right and locked there, returns to the left, and accordingly the switch 43 is closed to allow power supply. The push-button rod 41a moves to the right and is locked there, and accordingly an abutting pin 41-1 mounted on the right end of the rod 41a goes into a notch 81b formed in the deck 81 and pushes the free end 33a of the lever 33, the levers 33, 32, having been in the position of dotted line Z. Accordingly the levers 32, 33, are angled into their original configuration shown by solid line, thus permitting leftward movement of the support plate 82. Further, the right-hand side of the hole 82a pushes the shaft 28-1 and moves it leftward and the idler 28 begins to rotate, with which rotation of the plate 82 moves leftward further.

Prior to the time when the minimum point on the periphery of the eccentric idler 28 encounters the wheel 86b, the free end 29a of the lever 29 abuts the right end of the lever 29, and accordingly, with further rotation of a slight degree the idler 28 disengages from the wheel 86b and stops rotation. A linear portion 28b, formed by paring a part of the circular periphery of the idler 28, serves to insure the above-mentioned disengagement of the idler. Almost at the same time (slightly beforehand), the support plate 82 abuts the stop pin 82-1 and is held at its reproduction position to effect reproducing (or recording). At this time, the switch 45 is not depressed and accordingly the motor 84 rotates at the normal speed as controlled by the governor.

In place of the rotatable lever 29, a suitable bar slidable with respect to the deck 81 may be employed. In place of the levers 32, 33, which can swing with respect to each other, another conventional locking lever may be employed for locking the support plate 82 at recording/reproducing position. A mechanism of the type which includes levers 32, 33, however, has advantages because it produces no mechanical noise, requires only a small driving force and is stable in operation since it contains no sliding parts. Thus, the force required for depressing the push-button 40a is small. In addition, the forces required for swinging the lever 46 to release the locking engagement with the lever and for depressing the push-buttons 40b, 40c, 40d, as well as 40a, are also small.

A fundamental reason for the above is that there is little load on the idler 28 at the time when the idler 28 comes into contact with the wheel 86b and initiates rotation. This results in only a small force, in the form of a spring, which is needed for biasing the lever 29 in the direction of arrow H. In the above embodiment the reciprocating movement of the bar 39a has been utilized for releasing the lever 29 from locking engagement, but the rightward movement of the push-button rod 40b, 40c or 40d, may alternatively be utilized. According to the invention, the stroke of depression of the push-buttons 40a, 40b, 40c, 40d may be small. There is no striking motion in the movement of the support plate 82 because this movement of the plate 82 is performed by the rotation of the eccentric idler 28, and accordingly no mechanical noise accompanies the movement. As can be seen from the above description, mode changeover can be performed by depressing the desired one of the push-buttons 40a, 40b, 40c, and 40d, which is small in stroke and requires only a small force which is generally the same for each one of the push-buttons. In place of the above-described mechanism for driving the reel-stands 94, 96, conventional means utilizing the push-button rods 41a, 41b, 41c, 41d, for driving the idler may be employed.

Means for effecting review and cue modes will now be described. Two push-button switches, respectively, for review and cue are provided. With the push-button 40a (for reproduction) depressed, the push-button for cue is depressed to render the governor for the motor inoperative, to effect the cue mode. When the push-button 40a is depressed, the push-button for review is depressed which renders the governor inoperative and reverses the rotation of the motor, and operates thereby to effect the review mode. The push-button rod 41a need not necessarily be locked in its rightward moved position because with depresseion of the push-button 40a the other previously locked push-button rod returns to the left thus switching to reproduction mode.

In the embodiment of FIG. 3, high-speed drive for fast-feed or rewind mode is accomplished by increasing the rotating speed of the motor by rendering the governor inoperative through the switch 45 (to about 3 times the normal speed, for example) and by rendering the slip mechanism between the pulley 99 and the wheel 20 (FIG. 1) inoperative. This can be used to create a high-speed drive, for example, of about 12 times the normal-speed drive. When the support plate 82 is held at non-reproduction position, the governor is inoperative, and accordingly no additional electric switch for rendering the governor inoperative is required to be associated to the push-button rods 41b, 41c. It is difficult, however, to obtain further increased rotating speed of the motor for the purpose of further increased speed of drive in either fast-feed or rewind mode, because of the possibility of decrease in durability of the motor, especially in case of a cummutator motor.

Means for solving this problem is illustrated in FIG. 4 where a pulley 84a and a pulley 84b integral thereto are fixed to the rotating shaft of the motor 84 (FIG. 3) which extends downward from the body of motor. The pulley 84b has a radius as large as about 2 times, for example, that of the pulley 84a. A rubber belt 85 operably connects the pulley 84a and the pulley 87a of the flywheel 87 (FIGS. 2 and 3). The belt 85 has some excessive length. This extra length appearing between the pulleys 84a and 87a is prevented by means of an idler 47 which engages the belt 85 and is elastically pushed in the direction of arrow P by a lever mechanism and a spring (not shown).

The pulleys 84a, 84b, rotate counterclockwise, as shown by arrow W, which results when the recorder is in the reproducing state. A horizontal shaft 62 is rotatably supported on the bottom of body (not shown) of the recorder, and is elastically biased counterclockwise (as shown by arrow Q) by a spring (not shown). An L-shaped lever 61 is fixed to the shaft 62, and on the free end of the lower arm of the lever 61 is fixed a pair of guide pins 63a, 63b in a C-shaped configuration, the belt 85 running through between these guide pins. The top portion of the lever 61 abuts the right-hand side of the support plate 82 (FIG. 3).

When the plate 82 moves rightward to the reproduction position, the lever 61 is pushed in the direction of arrow N to be driven clockwise, and accordingly the guide pins 63a, 63b, are lowered. In addition, the belt 85 is lowered by the guide pin 63b, which engages the belt from above, and transferred onto the pulley 84b by means of a projection pin 84c mounted on the periphery of the pulley 84b. The belt 85 is then driven by the pulley 84b to run at an increased speed of about 2 times the previous speed, which results in the rotating speed of the flywheel 87 and the capstan 86 increasing by about 2 times. Since the governor for the motor is inoperative by means of the switch 45 (FIG. 3), the resultant rotating speed of the capstan 86 is increased about fourfold and the speed of the fast-feed or rewind is increased by about 2 times as compared with that when the belt 85 is on the pulley 84a. When the belt 85 is transfered onto the pulley 84b, the idler 47 is moved in the direction opposite to that of arrow P by the increased tension of the belt 85, thus preventing undesirable elongation of the belt 85. Then, upon leftward movement of the support plate 82 to reproduction position, the lever 61 rotates counterclockwise, being followed by rise of the guide pins 63a, 63b. Accordingly, the belt 85 is pushed upward and is transfered back onto the pulley 84a by the pin 84c so that the capstan 86 will rotate at the normal speed for recording/reproducing.

It should be noted that the mechanism of FIG. 4 utilizes the fact that the situation of the support plate 82 at non-reproduction position is always at the time of fast-feed or rewind, and the transfer of the belt 85 between the pulleys 84a and 84b is carried out by utilizing the movement of the plate 82, thereby increasing the speed of fast-feed or rewind. It should be appreciated, however, that during reverse rotation of the motor 84, transfer of the belt 85 by the pin 84c cannot be performed. Instead, for performing a mode changeover by depressing push-buttons 40a, 40b, 40c, 40d (FIG. 3), it is necessary to employ a conventional idler system which does not rely on the rotational direction of the motor 84.

Transfer of the belt 85 between the pulleys 84a and 84b is performed at the time of mode changeover operation, i.e., at the time of movement of the support plate 82 and when the motor 84 rotates in a forward direction. By employing a mechanism for maintaining forward rotation of the motor 84 during the mode changeover operation, the mechanism for driving the reel-stands 94, 96, shown in FIG. 1, which contains the levers 98, 22 and the pulley 99, can be utilized for transfering the belt 85.

FIG. 5 illustrates a mechanism for switching rotational direction of the motor between forward and reverse directions for the purpose of accomplishing the above-mentioned object. Referring to FIG. 5, a rotatable cam 70 and a gear 71 integral thereto are supported by the shaft 29-1 of the lever 29. A gear 72 is integrally connected to the idler 28. The gears 71 and 72 are of the same radius and mesh with each other. Thus, when the idler 28 comes into contact with the wheel 86d and makes one rotation, the cam 70 makes one rotation.

A concave portion 70a, formed by sparing a part of the circular periphery of the cam 70, abuts the right end of a bar 73. The bar 73 is supported in a manner that it can slide to the right and left, and is elastically biased rightward by a spring (not shown). The left-hand end of the bar 73 extends near to the projection 42 of the push-button rod 41b. The projection 42 abuts a changeover electric switch 44a. Upon depression of the push-button 40b for changeover to reproducing mode, the push-button rod 41b is moved to the right and locked there, and the projection 42 disengages from the switch 44a thereby switching rotational direction of the motor 84 to reverse direction.

At this time, the lever 46 (FIG. 3) makes one reciprocating swing to release the lever 29 from locking engagement, and the idler 28 then comes into contact with the wheel 86b and begins to rotate. Since the flywheel 87, due to its inertia, continues its counterclockwise rotation for a while without reversal of its rotational direction after the drive force is shut off, the wheel 86b likewise continues to rotate counterclockwise, the gear 72 clockwise, and both the gear 71 and the cam 70 counterclockwise.

The right end of the bar 73 then disengages from the concave portion 70a and comes into contact with circular periphery portion of the cam 70. Consequently the bar 73 is pushed and moved leftward, its left-hand end portion passing by the projection 42 and depressing the switch 44a to switch the rotation of the motor 84 to the forward direction.

With a half rotation of the idler 28, the support plate 82 is moved to the non-reproduction position and locked there. With a further half rotation of the idler 28, the shaft 28-1 (FIGS. 2 and 3) abuts against the left-hand side of the hole 82a in the support plate 82. With further rotation of a slight degree, the idler 28 disengages from the wheel 86b and stops its rotation. In this embodiment, it should be noted that for insuring such a stop rotation of the idler 28, the hole 82a has a leftward extended length larger than that in FIG. 2.

With one rotation of the idler 28, the gear 71 and the cam 70 make one rotation, and accordingly the right end of the bar 73 comes again into engagement with the concave portion 70a. The bar 73 moves to the right and the left end thereof disengages from the switch 44. This causes rotation of the motor 84 to be reversed to effect the rewind mode. During the time of the above-mentioned mode changeover operation, the motor 84 rotates in a forward direction, and transfer of the belt 85 between the pulleys 84a and 84b by the pin 84c (FIG. 4) can be performed.

Then, upon depression of the push-button 40a (FIG. 3), the push-button rod 41b returns back to the left, the motor 84 rotates in a forward direction, and the support plate 82 is released from locking engagement with the levers 32, 33, and begins to move leftward. At this time, the lever 46 (FIG. 3) makes one reciprocating swing, but this swing of the lever 46 has no effect on the lever 29 because the lever 29 is locked in position by means of the hole 82a. When the plate 82 reaches reproduction position, however, the free end 29a of the lever 29 comes into locking engagement with the right end of the lever 46. The plate abuts the stop pin 82-1 and is kept at that position, thus effecting the recording/reproducing mode.

Another alternative mechanism may also be employed. In this embodiment, when leftward movement of the bar 73 is the result of the right end of the bar 73 disengaging from the concave portion 70a, the lever 98 (FIG. 1) is driven clockwise, and, at the same time, the pinch roller 92 is held out of contact with the capstan 86. When this mechanism is used, at the time of the mode changeover the magnetic tape can be stopped or the speed thereof can be quickly decreased to prevent backlash of the tape.

Figure 7:
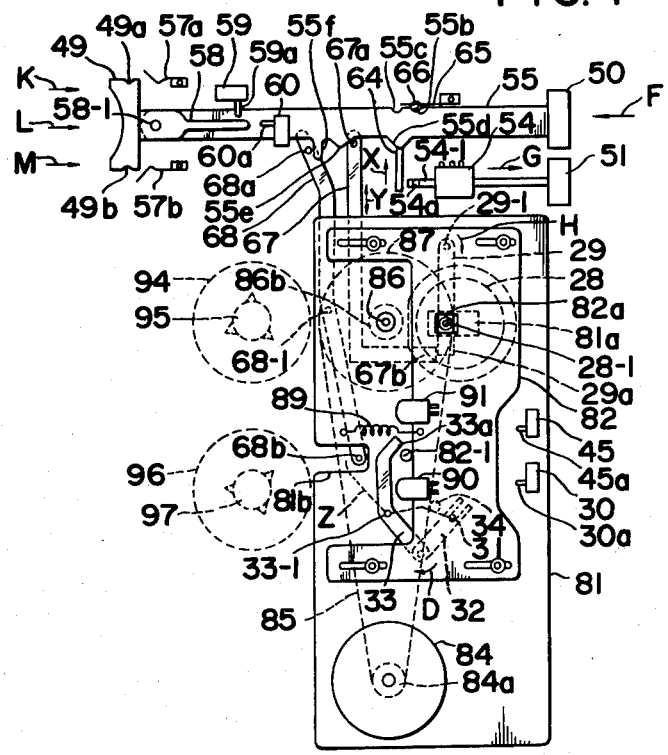
FIG. 7 is a plan view illustrating the internal construction of the embodiment of FIG. 6.

Referring now to FIGS. 6 and 7, another embodiment of the invention will be described. Similar numerals indicate like parts as above-described, and accordingly a detailed description thereof will be omitted. Referring to FIG. 6, a casing 48 of a recorder has a cover 52 attached thereto through a hinge 52-1. A cassette containing a magnetic tape 53 can be set into the casing 48 by opening the cover 52. The cover 52 has a window through which the magnetic tape 53 can be viewed. Push-buttons 49, 50, are provided on opposite sides of the casing 48, respectively.

It will be apparent from the following description, taken in connection with FIG. 7, that upon depression of the push-button 50 in the direction of arrow F, the reproducing mode is effected. With the push-button 50 depressed, when the push-button 49 is depressed in the direction of arrow K, cue mode is effected, and, upon depression of the push-button 49 in the direction of arrow M, review mode is effected, and, upon depression of the push-button 49 in the direction of arrow L, stop mode is effected. During stop mode, upon depression of the push-button 49 in the direction of arrow K, fast-feed mode is effected, and, upon depression of the push-button 49 in the direction of arrow M, rewind mode is effected. A push-button 51 is provided near the push-button 50. Upon depression of the push-buttons 50, 51 at the same time, recording mode is effected. On switching to modes other than the recording mode, the push-button 51 automatically springs back to its original position, so that erroneous erasing for the magnetic tape is prevented. As will be seen from the above description, the recorder of FIG. 6 can easily be held in one hand (the right hand, for example), and the push-buttons 50, 51, can be operated by the thumb and the push-button 49 by the forefinger.

Referring now to FIG. 7, the mechanism for mode changeover contained in the casing 48 will be described. The bar 55 is connected to the push-button 50 and is supported on the main body of the recorder in a manner that the bar 55 can slide to the right and left. A plate spring 65 is fixed at its one end to the body, and carries on its free end a steel ball 66 which is adapted to come into engagement with any one of depressions 55b, 55c, formed on the side of the bar 55 so that the bar 55 may be click-locked by the ball 66 selectively at two positions. A lever 58 is rotatably supported by a shaft 58-1 which is mounted on the left end of the bar 55 and is elastically held in a straight line with the bar 55 by a spring (not shown). The push-button 49, which is relatively wide is fixed coaxially to the left end of the lever 58. A mechanism for driving reel-stands 94, 96, is similar to that in FIG. 1, and is omitted from FIG. 7.

A motor 84 is located in the lower part of the casing 48 (FIG. 6). An L-shaped bar 67 is supported on the back side of a deck 81 in a manner that the bar can slide up and down, and is elastically biased upward (in the direction shown by arrow Y) by a light spring (not shown). The bar 67 carries at its top end an abutting pin 67a which abuts a generally triangular projection 55e provided on the side of the bar 55. When the bar 55 moves to the right or left, the bar 67 makes one up-and-down reciprocating movement by means of the projection 55e and the abutting pin 67a. With the reciprocation of the bar 67, the lower end 67b of the bar 67 disengages from the free end 29a of a lever 29 to release the lever 29 from locking engagement with the lever 67. A lever 68 is supported by a shaft 68-1 which is mounted on the back side of the deck 81 and is elastically biased clockwise by a light spring (not shown). An abutting pin 68a mounted on the upper free end of the lever 68 abuts a right-angular projection 55f provided on the side of the bar 55. FIG. 7 shows the recorder in the reproducing mode.

Upon depression of the push-button 49 in the direction of arrow L, the bar 55 is moved rightward and is click-locked there by the ball 66 through the depression 55c. The lever 68 swings clockwise and the bar 67 makes one reciprocating movement in the direction of arrow Y by means of the projection 55e and the abutting pin 67a. Consequently, the lever 29 is released from locking engagement with the bar 67 and an idler 28 makes about a half rotation and then stops. A support plate 82 is thus moved to non-reproduction position and is locked there by means of levers 32, 33.

With the rightward movement of the plate 82, an electric switch 30 is opened. The right end of the lever 58 depresses an actuator 60a which in turn opens an electric switch 60. The switches 60 and 30 are connected in parallel to each other and are interposed in the power-supply source circuit. When both the switches 60, 30, are open the power supply is shut off and the stop mode is effected.

When the push-button 49 is depressed in the direction of arrow K, the lever 58 is driven clockwise and is click-locked there by means of a plate spring 57a, the free end of which engages a depression 49a formed on one side of the push-button 49. The actuator 60a disengages from the lever 58, and accordingly power is supplied from the source. An actuator 45a of an electric switch 45 is depressed by the right-hand side of the support plate 82, thus rendering a governor for the motor 84 inoperative, causing the motor 84 to rotate in the forward direction at a high speed to effect the fast-feed mode.

When the push-button 49 is depressed in the direction of arrow M, the lever 58 is driven counterclockwise and is click-locked there by means of a plate spring 57b, the free end of which comes into engagement with a depression 49b formed on the other side of the push-button 49. The actuator 60a then disengages from the lever 58, thus allowing power to be supplied. With the counterclockwise swing of the lever 58, an actuator 59a of an electric switch 59 is depressed by the free end of the lever 58. The switch 59 is a switch for reversing the rotation of the motor 84 and accordingly the motor 84 rotates in reverse direction at a high speed, thus effecting the rewind mode.

When the push-button 50 is depressed in the direction of arrow F, the bar 55 is moved leftward and is click-locked there by the ball 66 which comes into engagement with the depression 55b. The lever 68 is driven counterclockwise by the projection 55f through the pin 68a. An abutting pin 68b mounted on the lower free end of the lever 68 then pushes free end 33a of the lever 33, which has been at the position of dotted line Z, rightward to cause the levers 33, 32, to angle with respect to each other. Accordingly, the support plate 82 moves leftward and the idler 28 presses against a wheel 86b which serves as the capstan power means and makes a half rotation and then stops. The plate 82 is kept at its leftward moved position by a stop pin 82-1, so that the reproducing mode is effected. Power is supplied because the actuator 60a disengages from the lever 58.

Then, upon depression of the push-button 49 in the direction of arrow K, the lever 58 is driven clockwise. This depression of the push-button 49 may be to an extent that the depression 49a does not come into engagement with the plate spring 57a. By providing an electric switch which becomes operative, by the clockwise swing of the lever 58, to cause the governor for the motor inoperative and to prevent sound output from loudspeaker, the cue mode can be obtained. Upon removing the depressing force from the push-button 49, the push-button 49 automatically springs back to its original position.

Alternatively, upon depression of the push-button 49 in the direction of arrow M, the lever 58 is driven counterclockwise, and the motor 84 is rotated in reverse direction at a high speed. This depression of the push-button 49 may be to an extent that the depression 49b does not come into engagement with the plate spring 57b. By providing an electric switch which becomes operative, by the counterclockwise swing of the lever 58, to cause the governor inoperative and to prevent sound output from loudspeaker, the review mode can be obtained. Upon removing the depressing force from the push-button 49, the push-button 49 automatically springs back to its original position, thus switching the recorder back to the reproducing mode.

Means for effecting the recording mode will now be described. Referring to FIG. 7, a conventional switch 54 for changeover between reproducing and recording is fixed to the body of the recorder. An actuator 54-1 of the switch 54 is elastically biased in the direction of arrow G by a spring (not shown). A bar 64 is supported on the body in a manner that the bar 64 can slide up and down. The bar 64 is also elastically biased in the direction of arrow X by a spring (not shown).

In the state shown in FIG. 7, the top end of the bar 64 abuts the top of a generally triangular projection 55d provided on the side of the bar 55, thus limiting upward movement of the bar 64. In this state, if the push-button 51 is subjected to depressing force, leftward movement of the actuator 54-1, which is associated to the push-button 51, is prevented by the bar 64 which abuts against the left end of the actuator 54-1, and accordingly changeover to recording cannot be carried out. In the state where the push-button 49 is depressed in the direction of arrow L and the bar 55 is moved to the right, i.e., in the stop mode, however, the bar 64 disengages from the top of the projection 55d, moves upward along the left-side slope of the projection 55d and is held there. In this case, leftward movement of the actuator 54-1 is not limited.

When both the push-buttons 51, 50, are going to be depressed by the thumb, the push-button 51 will be depressed, as a rule, slightly earlier than the push-button 50. Accordingly, when the push-button 51 is depressed first the actuator 54-1 moves to the left without limitation due to the bar 64. Upon succeeding depression of the push-button 50, the bar 55 moves leftward and the bar 64 is pushed and moved downward by the projection 55d. The lower end portion of the bar 64 comes into engagement with a notch 54a provided in the actuator 54-1 near the left end thereof, so that the actuator 54-1 is locked in position by the bar 64. In this way, the reproducing state is effected, and, with the actuator 54-1 being kept in its leftward moved position, the recording mode is effected, the switch 54 having been switched to recording.

Then, upon depression of the push-button 49 in the direction of arrow M, the bar 55 moves rightward, and the bar 64 disengages from the top of the projection 55d and moves upward. Consequently, the actuator 54-1 moves back to the right, and the switch 54 is changed over to reproducing, and accordingly, by the succeeding depression of the push-button 50, the reproducing mode is effected. It will be apparent from the above erroneous erasing will be prevented.

Referring now to FIGS. 8 and 9, an embodiment of a recorder in which a pose mechanism has been incorporated will be described. Similar numerals indicate like parts (though somewhat different in configuration) as above-described, and accordingly a detailed description of them will be omitted. Referring to FIG. 8, push-buttons 50, 49, are provided on a casing 48 of the recorder for selective mode changeover between reproducing, stop, rewind, fast-feed, review and cue. A push-button is provided for pose and a slide control 107 for recording.

Referring to FIG. 9, the internal construction of the casing 48 will be described. A lever 125 is supported by a shaft 125-1, which is mounted on a support plate 82, and carries on its free end a pinch roller 92. A stop pin 125a is mounted on the plate 82 for limiting rotation of the lever 125. A wheel-assembly 136 consisting of a gear and pulley integral to each other is rotatably supported by a shaft 133-1 which is mounted on the bottom of the main body of recorder. A lever 133 is also supported by the shaft 133-1 in a manner that the lever 133 can rotate independently of the wheel-assembly 136. A gear 134 and a wheel 135, which is integral and coaxial to the gear 134, are supported on the free end of the lever 133 through a shaft 135-1. The gear 134 and the gear of the wheel-assembly 136 mesh with each other. Accordingly, the wheel 136 and the wheel 135 rotate in opposite directions with respect to each other. The pulley of the wheel-assembly 136 and a pulley 88 are operably connected by a drive belt 132.

A cassette containing a magnetic tape is omitted from the figure. In reproducing mode, a capstan 86 rotates counterclockwise. Accordingly, the lever 133 is subjected to a counterclockwise torque due to friction between the gear 134/wheel 135 and the shaft 135-1. Accordingly, the wheel 135 is pressed lightly against a rubber ring provided around the periphery of a reel-stand 94. The reel-stand 94 is thus rotated counterclockwise, and as a reaction thereto, the lever 133 is subjected to a further counterclockwise torque. An increasing load on the reel-stand 94 brings about an increasing pressing force of the wheel 135 against the reel-stand 94, thus making transmission of drive force between them surer, i.e., the wheel 135 presses against the reel-stand 94 in a wedging angle relationship. The mgnetic tape is taken up through a reel-shaft 95, to effect reproduction. Running speed of the magnetic tape is limited by the rotational speed of the capstan 86 and, in order to protect the tape from excessive tension a conventional slip mechanism using a felt sheet is provided to allow slip between the wheel 135 and the gear 134.

When the rotational direction of the motor 83 is reversed, the rotational directions of the pulley 88 and of the wheel-assembly 136 are also reversed. The wheel 135 can easily disengage from the reel-stand 94 due to a relief angle relationship appearing therebetween. The lever 133 is subjected to a clockwise torque and swings clockwise, so that the wheel 135 comes in contact with a rubber ring provided around the periphery of a reel-stand 96 in a wedging angle relationship, thus effecting a sure transmission of drive force therebetween.

As will be understood from the above description, the reel-stand 94 or 96 can be selectively driven in response to rotational directions of the motor 84. Contact of the wheel 135 against the reel-stand 94, 96, for transmission of drive force is in a wedging angle relationship, so that torque and consequently the force for driving the lever 133 may be small. Upon reversal of rotational direction, relationship between the wheel 135 and the reel-stand 94 or 96 which are hitherto in pressing contact with each other will become a relief angle relation, and accordingly the wheel 135 can easily disengage from the reel-stand. Accordingly, rotational movement of the lever 133 will be smooth and sure. In order to effect the above-mentioned wedging angle relationship between the wheel 135 and the reel-stands 94, 96, the shaft 133-1 is located at a position opposite to a magnetic head 91 with respect to the straight line joining shafts 95-1 and 97-1.

A mechanism for mode changeover by means of the push-buttons 50, 49, will now be described. Referring to FIG. 9, upon depression of the push-button 40 in the direction of arrow L, a lever 58 and a bar 55 move rightward, and a switch 60 is opened through an actuator 60a which is depressed by the lever 58. Since the switch 60 is a power supply line switch, upon opening of the switch 60, the power supply is shut off, and the stop mode is thus effected. At the same time, a branch-shaped bar 113 integral to the bar 55 moves rightward to cause, through an abutting pin 113a mounted on the right end of the bar 113, the support plate 82 to move rightward. The magnetic head 91 and the pinch roller 92 will thus disengage from the cassette and come to the non-reproducing position.

When the push-button 49 is depressed in the direction of arrow K, the lever 58 swings clockwise, and the right end of the lever 58 depresses an actuator 111a of an electric switch 111 to render the switch 111 operative, which switch 111 in turn renders a governor for the motor 84 inoperative. At the same time, the right end of the lever 58 disengages from the actuator 60a, so that power is supplied from the source. Accordingly, the motor 84 rotates in forward direction at a high speed and the magnetic tape is taken up through the reel-shaft 95 at a high speed to effect the fast-feed.

When the push-button 40 is depressed in the direction of arrow M, the lever 58 swings counterclockwise and depresses an actuator 59a to render an electric switch 59 operative. With the switch 59 being operative, the governor is rendered inoperative and a switch (not shown) for reversing rotational direction of the motor 84 is rendered operative. The motor 84 will then rotate in reverse direction at a high speed. The wheel 135 will come into contact with the reel-stand 96 to drive the reel-stand 96 and the magnetic tape is taken through the reel-shaft 97 at a high speed. The rewind mode is thus effected.

Then, upon depression of the push-button 50 in the direction of the arrow F, the bar 55 and the lever 58 to move to the left and click-locked there (at the position shown in the figure). The bar 55 and the lever 58 are aligned in a straight line and the reproducing mode is effected.

At this time, depression of the push-button 49 in the direction of arrow K to a predetermined extent drives the lever 58 clockwise to depress the actuator 111a of the switch 111 which renders the governor inoperative. This causes the capstan 86 to rotate at an increased speed, thus effecting the cue mode. Alternatively, depression of the push-button 49 in the direction of arrow M to a predetermined extent drives the lever 58 counterclockwise to depress the actuator 59a. This causes the capstan 86 to rotate in reverse direction at a high speed, thus effecting the review mode. Upon removal of the depressing force from the push-button 49, the 58 springs back to its original position, thus effecting the reproducing mode again. Suppression of sound output from the loud-speaker during the cue and review modes by utilizing the switches 59, 111, is preferable.

A mechanism for recording will now be described. A changeover switch 119 is associated with the slide control 107 and is adapted to perform changeover between circuits, respectively, for reproducing and recording. When the control 107 is slid upward by a finger (in the direction opposite to the direction of arrow E), changeover to the recording is effected. When the finger is removed from the control 107, the control 107 automatically springs back downward in the direction of arrow E by means of a spring (not shown).

A rod 120 is provided in a manner that the rod 120 may be moved up and down in conjunction with sliding movement of the control 107. In the state of reproducing as shown in the figure, upward sliding of the control 107 is prohibited because the top end of the rod 120 abuts against a right-angular bent portion 108a formed on the side of the bar 55. Accordingly, the rod 120 cannot move upward.

During the stop mode, however, the bar 55 is kept at its rightward moved position, and the control 107 is allowed to move upward, the top portion of the rod 120 passing by the bent portion 108a. Upward sliding of the control 107 by a finger is, as a rule, followed by depression of the push-button 50 which is depressed by the same finger. Accordingly, a state which is the same as the reproducing mode is effected, and at the same time, the bent portion 108a comes into locking engagement with a notch 120a formed in the back side of the rod 120. In this way, the control 107 is prevented from springing back, thus effecting and maintaining the recording mode.

Upward sliding of the control 107 by a finger during fast-feed or rewind mode, for example, is followed by depression of the push-button 50 in a like manner as the above, and the push-button 49 is released from locking engagement with the plate spring 57a or 57b. Accordingly, the lever 58 springs back to its neutral position which is linear to the bar 55, and the rod 120 comes into locking engagement with the bent portion 108a. In this way, the recording mode is effected.

In case of other modes, the top end of the rod 120 abuts against the bent portion 108a, and mode changeover is prevented. Upon depression of the push-button 49 in either direction of arrow L, K or M, for changeover from recording mode to fast-feed, stop or rewind mode, the bar 55 moves rightward and the rod 120 is released from locking engagement with the bent portion 108a, and changeover to a desired mode can be effected. Also, erroneous erasing is prevented.

A mechanism for pose will now be described. A bar 137 is supported on the bottom of the body of recorder in a manner that the bar 137 can slide both right and left. To the left end of the bar 137 is fixed the push-button 106. The bar 137 carries on its right end an abutting pin 137a which is adapted to abut against the left-hand side of the support plate 82. The bar 137 carries also near its left end an abutting pin 137b which is adapted to abut against the right-hand side of a projection 133a provided to the lever 133.

Upon depression of the push-button 106 in the direction of arrow N during recording, the bar 137 moves rightward, and the plate 82 is moved rightward through the pin 137a. The pinch roller 92 then departs away from the capstan 86 and the magnetic tape stops running temporarily. At the same time, the pin 137b pushes the projection 133a to drive the lever 133 clockwise, and the wheel 135 disengages from the reel-stand 94 temporarily, thus taking up of the magnetic tape is stopped and the pose mode is effected. Upon removal of the depressing force from the push-button 106, the lever 137 springs back to the left automatically by a biasing spring (not shown), and the above-mentioned moved parts return to their original positions to effect recording again.

A modification of mechanism containing the wheels 136, 135, and the gear 134 (FIG. 9) will now be described in connection with FIG. 11. Similar numerals indicate like parts as in FIG. 9, and a detailed description thereof will be omitted. A generally T-shaped lever 133, a pulley 151 and a wheel 150 are supported by a shaft 133-1 which is mounted on the bottom of the main body of the recorder. Between the pulley 151 and the wheel 150 is provided a conventional frictional slip mechanism consisting of a felt sheet. A lever 154 is rotatably supported on one free end of the lever 133, through a shaft 154a. Wheels 152, 153 are supported on the free end of the lever 154 through a shaft 153-1, the wheels 152, 153 being integral to each other. The lever 154 is elastically biased counterclockwise (as shown by arrow G) with respect to the lever 133 by a light spring (not shown). The wheel 150 is provided around its periphery with a rubber ring to obtain an improved transmission of drive force between the wheels 150, 152, when they contact with each other.

At the time of reproducing or fast-feed, wherein the capstan 84 (FIG. 9) rotates counterclockwise, the lever 133 swings counterclockwise in a like manner as discussed in connection with FIG. 9, and the wheel 153 comes into contact with the reel-stand 94 with a small pressing force. This contact of the wheel 153 against the reel-stand 94, however, is in a wedging angle relationship, and consequently the wheel 153 presses against the reel-stand 94 with a sufficiently large force so that the reel-stand 94 is driven to rotate and take up a magnetic tape with certainty. Upon reversal of rotational direction of the motor 84 (FIG. 9), the relationship between the wheel 153 and the reel-stand 94 is in the form of a relief angle. The lever 133 swings clockwise and the wheel 153 disengages from the reel-stand 94 and comes into contact with the reel-stand 96 (FIG. 9) in a wedging angle relationship to drive the reel-stand 96 in a like manner as discussed in connection with FIG. 9. This mechanism of FIG. 11 contains no gear, and accordingly has an advantage that mechanical noise can be avoided, other effects being the same as in the mechanism of FIG. 9.

An embodiment applied for a very small-sized magnetic recording/reproducing apparatus wherein a micro-cassette is used will now be described in connection with FIG. 10. Similar numerals indicate like parts as described above, and a detailed description thereof will be omitted. Referring to FIG. 10, a magnetic head 91 and an erase head 90 are carried by a stationary support 142 which if fixed to the main body of the recorder, as is ordinarily seen in a very small-sized recorder, i.e., the heads 91, 90, are always in contact with a magnetic tape. No capstand is used, and alternatively a "rim-drive" system is employed.

A wheel-assembly 145 consisting of a pulley (lower side) and a gear (upper side) integral to each other is supported by a shaft 144-1 mounted on the bottom of body. A lever 144 is supported also by the shaft 144-1, and carries on its free end through a shaft 146-1 mounted thereon a flywheel 147, and a gear 146 and cylindrical wheel 148 which are integral to one another. The flywheel 147 is for the purpose of improving the quality of reproduced sound. The gear of the wheel-assembly 145 and the gear 146 mesh with each other. The pulley of the wheel-assembly 145 is operably connected to a pulley 84a of a motor 84 by means of a drive belt 143.

When the pulley 84a rotates counterclockwise, the lever 144 swings counterclockwise, and the wheel 148 comes into contact with and presses against a rubber ring provided around the periphery of a reel-stand 94 in a wedging angle relationship and drives the reel-stand 94 counterclockwise. When the rotational direction of the motor 84 is reversed, the lever 144 will swing clockwise and the wheel 148 will disengage from the reel-stand 94 with ease because of the relief angle relation therebetween. This wheel 148 will then come into conact with and press against a reel-stand 96 in a wedging angle relationship to drive the reel-stand 96 counterclockwise. The above-described operation is similar as in the embodiment of FIG. 9. Thus, the reel-stands 94, 96, can be selectively driven in a desied direction in response to rotational directions of the motor 84. Accordingly, mode changeover can be performed by means of a bar 55, a lever 58, push-buttons 50, 49, and a slide control 107, which are the same in construction as those in FIG. 9. The mechanism of FIG. 11 may be utilized also in the embodiment of FIG. 10.

The construction of FIG. 10, however, has no mechanism for moving a magnetic head and a pinch roller, so that the magnetic head and the pinch roller are kept at the same positions in all the modes of review, cue, rewind and fast-feed. Accordingly, it is preferable to provide an electric circuit for shutting off sound output at the time of rewind and fast-feed. Provision of means for disengaging the magnetic head from the cassette, similar to those shown in FIG. 3, is also preferable.

In general, 8 push-bottons are required for effecting the respective modes of stop, reproducing, fast-feed, rewind, review, cue and pose, and a mechanical or electrical alternative-selection mechanism is required. Arrangement of such a large number of push-buttons, however, is difficult for a small-sized portable recorder because of the relatively small amount of space in the recorder. Further, a recorder having such a large number of push-bottons is inconvenient for manual operation, and renders "one-hand" operation impossible.

The embodiment of FIG. 10 requires, likewise as in the embodiment of FIGS. 8 and 9, only 3 push-bottons 50, 49, 106 (push-botton 106 is omitted from FIG. 10) and one slide control 107. The recorder in this embodiment is simple in construction, can be flat in shape, small in size and operated with one hand, and is also low in cost.

Referring now to FIG. 12, another example of the mechanism for pose will be described. A generally Y-shaped lever 159 is supported by a shaft 159-1, which is mounted on the main body of recorder, and carries on the free ends of its two arms pulleys 160, 161, through shafts 160-1, 161-1 respectively. The pulleys 160 and 161 are located symmetrically to each other with respect to the shaft 159-1. On a third arm of the lever 159 are rotatably supported through a shaft 162-1 a pulley 162 and an idler 163, which frictionally engage each other by means of a slip mechanism using a felt sheet.

The pulleys 160, 162, 161, and a pulley 84a of a motor 84 are operably connected, in this order, by a drive belt 164. When the pulley 162 is rotated through the belt 164, the idler 163 is rotated. In case a load larger than a predeterminded value is imposed on the idler 163, the idler 163 slips with respect to the pulley 162.

When the motor 84 rotates in a forward direction (counterclockwise), the lever 159 is driven counterclockwise due to a difference in tension appearing between portions 164a and 164b of the belt 164. The idler 163 then comes into contact with a rubber ring provided around the periphery of a reel-stand 94. Since the idler 163 is rotated counterclockwise, the reel-stand 94 is rotated counterclockwise to take up a magnetic tape. As a reaction to the relational rotations of the idler 163 and the reel-stand 94, the lever 159 undergoes an increased counterclockwise torque, and accordingly the idler 163 presses against the reel-stand 94 with an increased force in a wedging angle relationship. A pinch roller 92 (FIG. 9) presses the magnetic tape against a capstan 86 to drive the tape in forward direction at a constant speed, thus effecting reproducing (or recording) mode. The idler 163 slips with respect to the pulley 162 through the slip mechanism. FIG. 12 shows the recorder in the reproducing (or recording) mode.

Upon reversal of rotational direction of the motor 84, relational difference in tension between the portions 164a and 164b is reversed, and the lever is driven clockwise. The idler 163 disengages from the reel-stand 94 and comes into contact with a rubber ring provided around the periphery of a reel-stand 96 to drive the reel-stand 96 clockwise. At this time, a relief angle relationship is formed between the idler 163 and the reel-stand 94, and the idler 163 contacts against the reel-stand 96 in a wedging angle relationship. In this way, the movement of the idler 163 from the reel-stand 94 to the reel-stand 96 can be performed smoothly with ease.

Since the above-mentioned difference in tension between the portions 164a and 164b is brought about by friction between the pulleys 160, 161, 162, and their respective shafts, decrease of the center distance between the shafts 159-1 and 162-1, as compared with the center distances between the shafts 159-1 and 160-1 and between the shafts 159-1 and 161-1, is desirable so that force required for driving the lever 159 can be reduced. In practical use, it is preferable that respective center distances between the shafts 159-1 and 160-1 and between the shafts 159-1 and 161-1 are several times (3 to 5 times) the center distance between the shafts 159-1 and 162-1. It is also preferable that respective moments about the shaft 159-1 brought about by the portions 164a and 164b are equal to each other so that substantially no moment is imposed on the lever 159 at the time when the motor 84 does not rotate.

As can be seen from the above description, upon reversal of rotational direction of the motor 84, the magnetic tape is taken up through a reel-shaft 97, to effect the rewind or review mode, wherein a governor for the motor 84 is, as a rule, rendered inoperative to increase rotating speed of the motor 84 to a value of several times, for example, the governor-controlled normal speed.

The operation of the mechanism for switching to pose will now be described. A bar 176 is supported by support members 177-1, 177-2, on a deck (not shown) in the main body of recorder in a manner that the bar 176 can slide to the right and left, and is elastically biased leftward (as shown by arrow P) by a spring (not shown). On the right end of the bar 176 is mounted an abutting pin 176a which is adapted to come into and out of a notch 159a provided in the free end of the above-mentioned third arm of the lever 159. A push-button 175 is fixed to the left end of the bar 176. Upon depression of the push-button 175 rightward, the bar 176 is moved rightward and the pin 176a comes into the notch 159a to drive the lever 159 counterclockwise by a slight degree from the position shown in the figure. Accordingly, the idler 163 is moved to a neutral position where the idler 163 is out of contact with either of the reel-stand 94, 96, thus neither the reel-stand 94 nor 96 is driven. At the same time, the pinch roller is disengaged from the capstan 86 by means of a suitable mechanism which is operated in response to the movement of the bar 176. The magnetic tape stops running while the motor 84 continues rotation, i.e., pose mode is effected. Upon removal of the depressing force from the push-button 175, the bar 176 springs back to the left automatically, and the magnetic tape begins running again.

Thus, there is provided in accordance with the invention a recording mechanism which has the advantage discussed above. The embodiments described are intended to be merely exemplary and those skilled in the art will be able to make variations and modifications in them without departing from the spirit and scope of the inventions. All such modifications and variations are contemplated as falling within the scope of the claims.

What is claimed is:

1. An improvement in a mode changeover apparatus for a magnetic recorder/player of the type which includes means for moving, along a surface of a deck provided in the main body of the recorder/player, a support carrying a magnetic head and the like toward and away from a magnetic tape set in the recorder/player, a spring for elastically biasing said suppot in one direction, reproduction push-botton means for effecting reproducing mode, push-button means for effecting respective modes of stop, fast-feed and rewind, an alternative-selection mechanism for alternatively locking some of said push-button means in position and releaving others of said push-button means from locking engagement when one of said modes is effected, reel driving means for driving, through depression of said fast-feed push-button, a take-up reel-shaft at a high speed, and driving, through depression of said rewind push-button, a supply reel-shaft at a high speed in a reverse direction, and means for shutting off, through depression of said stop push-button, power supply to a motor for capstan power means, the improvement comprising:
   a. restraining means for restraining against the elastic force of said spring said support to a reproduction position when said support has been moved near to the magnetic tape;
   b. locking means for locking against the elastic force of said spring said support at a non-reproduction position where said support has been moved remotely from the magnetic tape;
   c. an eccentric idler rotatably supported by a movable member provided to said deck;
   d. spring means for elastically biasing said movable member in a manner that said idler may be rotated by said capstan power means;
   e. engaging means for making, in accordance with the movement of said movable member, engagement with said support to move said support to the non-reproduction position;
   f. locking member for locking said movable member at a point where a portion of the periphery of said idler having substantially smallest radius with respect to the rotating axis of said idler confronts said capstan power means;
   g. means for temporarily relieving, through depression one of said push-buttons for stop, fast-feed and rewind, the locking action of said locking member;
   h. means for releasing, through depression of said reproduction push-button, said support from locking engagement with said locking means made at the non-reproduction position;
   i. said support, along with taking up of the magnetic tape by the take-up reel-shaft driven through depression of said reproduction push-button, advancing toward the magnetic tape and then being held there by said restraining means;
   j. means for holding, upon said advance of said support toward the magnetic tape, said idler apart from said capstan power means with a small gap left between said substantially smallest radius portion of the periphery of said idler and said capstan power means; and
   k. whereby said idler, through depression of any one of said push-bottons for stop, fast-feed and rewind, and then being locked by said locking rotating means in a manner that a portion of the periphery of said idler having substantially largest radius with respect to its rotating axis confronts said capstan power means, and the take-up reel-shaft, through depression of said fast-feed push-button, being rotated at a high speed, and the supply reel-shaft, through depression of said rewind push-button, being rotated at a high speed in reverse direction.

2. A mode changeover apparatus according to claim 1 including push-bottons corresponding to the respective modes, and push-button rods each associated to each of said push-buttons and elastically biased in one directin by a spring, wherein said alternative-selection mechanism comprises projections each of which is provided to one of said push-button rods and has a slope on one side and a step on the other side, and a locking bar elastically biased in one direction by a spring and having locking pins each adapted to make engagement with each of said projections.

3. A mode changeover apparatus according to claim 1, wherein said locking means comprises a first lever rotatably supported to the deck, and a second lever pivotally connected to said first lever and associated to said support, said first and second levers being elastically biased with respect to each other in a direction that they may be aligned in a straight line by a spring.

4. A mode changeover apparatus according to claim 1, wherein said movable member includes a rotatable lever provided to the deck.

5. A mode changeover apparatus according to claim 1, wherein said movable member includes a bar slidable with respect to the deck.

6. A mode changeover apparatus according to claim 1, wherein said engaging means for moving, in accordance with the movement of said movable member, said support to the non-reproduction position includes a hole provided in said support, and the shaft of said idler loosely passing through said hole.

7. A mode changeover apparatus according to claim 1, wherein said locking member for locking said movable member includes a movable lever rotatably supported by a shaft mounted to the main body, an end of said movable lever abutting said movable member.

8. A mode changeover apparatus according to claim 1, wherein said means for temporarily relieving the locking action of said locking member includes a locking lever adapted as said locking member and abutting said locking bar which is moved through one of said locking pins which comes, upon depression of one of said push-buttons for stop, fast-feed and rewind, into engagement with the projection provided to the corresponding push-button rod.

9. A mode changeover apparatus according to claim 1, wherein said means for releasing said support from locking engagement with said locking means to effect reproducing consisting of an abutting member associated to the push-button rod corresponding to said reproduction push-button, said abutting member pushing, through depression of said reproduction push-button, said first lever to cause said first and second levers to angle with respect to each other.

10. A mode changeover apparatus according to claim 1, wherein said means for holding said idler apart from said capstan power means with a small gap left therebetween consisting of a pared portion provided in the periphery of said idler.

11. A mode changeover apparatus according to claim 1, wherein said reel driving means includes a first lever, a first pulley and a first wheel rotatably supported by a shaft mounted to the main body, a second lever pivotally connected to the free end of said first lever, a second wheel rotatably supported to the free end of said second lever, a spring provided between said first and second levers to cause said first and second wheels to press against each other, a second pulley driven together with the capstan by the motor, and a drive belt operably connecting said first and second pulleys to each other, whereby said first and second levers are rotated clockwise or counterclockwise due to frictions between said first lever and said first wheel and between said first and second wheels depending on clockwise or counterclockwise rotation of the motor, thereby said second wheel pressing selectively against the periphery of either one of a pair of reel-stands in a wedging angle relationship.

12. A mode changeover apparatus according to claim 11, wherein said first lever includes a balance weight attached thereto.

13. A mode changeover apparatus according to claim 11, and further including means for holding, through operation of a pose push-button, said second wheel at a neutral position where said second wheel does not contact with any one of said reel-stands.

14. A mode changeover apparatus according to claim 1, wherein said reel driving means includes a lever rotatably supported by a shaft mounted to the main body, a first pulley and an idler rotatable synchronously thereto, both of said pulley and said idler being provided to said lever at a position near said shaft of said lever, second and third pulleys provided to said lever respectively at two positions which are remote from said shaft of said lever and are substantially symmetrical to each other with respect to said shaft of said lever, a fourth pulley driven together with the capstan by the motor, and a drive belt operably connecting said first, second, third and fourth pulleys to one another, whereby said lever is rotated clockwise or counterclockwise due to difference in tension between two portions of said belt appearing respectively in two ways depending on clockwise or counterclockwise rotation of the motor, thereby said idler pressing selectively against the periphery of either one of a pair of reel-stands in a wedging angle relationship.

15. A mode changeover apparatus according to claim 14, and further including means for holding, through operation of a pose push-button, said idler at a neutral position where said idler does not contact with any one of said reel-stands.

16. A mode changeover apparatus according to claim 1, wherein said reel driving means includes a first lever, a first pulley and a first wheel rotatably supported by a shaft mounted to the main body, second and third pulleys provided to said first lever respectively at two positions which are remote from said shaft and are substantially symmetrical to each other with respect to said shaft, a second lever pivotally connected to the free end of said first lever, a second wheel rotatably supported to the free end of said second lever, a spring provided between said first and second levers to cause said first and second wheel to press against each other, a fourth pulley driven together with the capstan by the motor, and a drive belt operably connecting said first, second, third and fourth pulleys to one another, whereby said first and second levers are rotated clockwise or counterclockwise due to frictions between said first lever and said first wheel and between said first and second wheels depending on clockwise or counterclockwise rotation of the motor, thereby said second wheel pressing selectively against the periphery of either one of a pair of reel-stands in a wedging angle relationship.

17. A mode changeover apparatus according to claim 16, and further including means for holding, through operation of a pose push-button, said second wheel at a neutral position where said second wheel does not contact with any one of said reel-stands.

18. A mode changeover apparatus according to claim 1, wherein said reel driving means includes a lever, a first pulley and a first rotator rotatably supported by a shaft mounted to the main body, a second rotator rotatably supported to the free end of said lever and engaging with said first rotator, a wheel supported coaxially with respect to said second rotator, a second pulley driven together with the capstan by the motor, and a drive belt operably connecting said first and second pulleys to each other, whereby said lever is rotated clockwise or counterclockwise due to friction between said second rotator and said wheel depending on clockwise or counterclockwise rotation of the motor, thereby said wheel pressing selectively against the periphery of either one of a pair of reel-stands in a wedging angle relationship.

19. A mode changeover apparatus according to claim 18, wherein said lever includes a balance weight attached thereto.

20. A mode changeover apparatus according to claim 18, and further including means for, through operation of a pose push-button, locking said lever to hold said wheel at a neutral position where said wheel does not contact any one of said reel-stands, and moving said support to a position remote from the magnetic tape thereby to temporarily stop the running of said magnetic tape.

21. A mode changeover apparatus for a magnetic recorder/player comprising:
   a. a bar traversing the main body of the recorder/player and supported slidably in the longitudinal direction of said bar;
   b. a first push-button fixed to an end of said bar and exposing the top end of said push-button outside of the main body;
   c. a lever rotatably supported to the other end of said bar through a shaft;
   d. a second push-button fixed to an end of said lever remote from said first push-button;
   e. an elastic member for elastically holding said bar and said lever substantially in a straight line;
   f. click-locking means for locking said bar at a first and a second positions along the sliding passage of said bar;
   g. an ordinarily closed electric switch for, through abutment with the other end of said lever, shutting off current supply from an electric power source, and, through disengagement from said other end of said lever, allowing current supply;
   h. a first and a second electric switches becoming operative through said other end of said lever respectively by the counterclockwise and clockwise rotations of said lever; and
   i. a control circuit for controlling a governor for a motor for the operation of the recorder/player;
   j. said control circuit, upon operation of said first switch, rendering said governor inoperative, and, upon operation of said second switch, rendering said governor inoperative and reversing the rotational direction of said motor.

22. A mode changeover apparatus according to claim 21, and further including a slide control provided near to said first push-button, sliding of said slide control being capable of effecting substantially simultaneous depression of said first push-button, a changeover switch operably connected to said slide control for effecting changeover between recording and reproducing, an actuating bar associated to said changeover switch and elastically biased in one direction by a spring, and means for locking said actuating bar at a position against the biasing force of said spring, whereby recording can be effected through said changeover switch by the sliding of said slide control and be maintained by said locking means locking said actuating bar in position.

23. A mode changeover apparatus according to claim 21, and further including reel driving means driven by the motor, said reel driving means, in response to forward rotation of the motor, driving a first reel-shaft to take up a magnetic tape thereon, and, in response to reverse rotation of the motor, driving a second reel-shaft to take up the magnetic tape thereon.

24. A mode changeover apparatus according to claim 21 being of a capstanless stationary-support type, and further including a first lever, a first pulley and a first wheel rotatably supported by a shaft mounted to the main body, a second lever pivotally connected to the free end of said first lever, a second wheel rotatably supported to the free end of said second lever, a spring provided betwween said first and second levers to cause said first and second wheels to press against each other, a second pulley driven by the motor, and a drive belt operably connecting said first and second pulleys to each other, whereby said first and second levers are rotated clockwise or counterclockwise due to frictions between said first lever and said first wheel and between said first and second wheels depending on clockwise or counterclockwise rotation of the motor, thereby said second wheel presses selectively against the periphery of either one of a pair of reel-stands in a wedging angle relationship.

25. A mode changeover apparatus according to claim 21 being of a capstanless stationary-support type, and further including reel driving means comprising a lever, a first pulley and first rotator rotatably supported by a shaft mounted to the main body, a second rotator rotatably supported to the free end of said lever and engaging with said first rotator, a wheel supported coaxially with respect to said second rotator, a second pulley driven by the motor, and a drive belt operably connecting said first and second pulleys to each other, whereby said lever is rotated clockwise or counterclockwise due to friction between said second rotator and said wheel depending on clockwise or counterclockwise rotation of the motor, thereby said wheel presses selectively against the periphery of either one of a pair of reel-stands in a wedging angle relationship.

26. A mode changeover apparatus to claim 1, and further including a lever rotatably supported by a shaft mounted to the main body, said lever being elastically biased in one direction by a spring and abutting against the support, and belt guide means provided to said lever to engage with a drive belt operably connecting said capstan power means and the motor to each other, said motor having two pulleys of different radii adapted to alternatively engage with said belt, whereby, in non-reproduction mode, said belt being transferred between said two pulleys through said belt guide means which change their position by the rotation of said lever due to retreating movement of said support, thereby changeover of the running speed of said belt between a low speed and a high speed is effected by utilizing one directional rotation of said motor.

27. A mode changeover apparatus according to claim 26, and further including means for maintaining the motor in a forward rotating state comprising a movable member, a cam and a first rotator rotatably supported by a shaft mounted to the deck, said cam being rotated together with said first rotator, a second rotator and an idler rotatably supported to the free end of said movable member, said second rotator operably engaging with said first rotator, and a bar associated to a pushbutton rod corresponding to the reproduction pushbutton, an end of said bar abutting against the periphery of said cam, whereby said motor is maintained in a forward rotating state during mode changeover operation.

28. A mode changeover apparatus according to claim 27, and further including means for rotating the lever of the reel driving means by said bar and at the same time causing the capstan to depart away from the pinch roller to a slight extent by said bar when said lever has been moved in one direction by the rotation of said cam, whereby, during mode changeover operation, the running of the magnetic tape is stopped or rapidly reduced in speed, thereby backlash of the magnetic tape being avoided.

* * * * *

UNITED STATES PATENT OFFICE
CERTIFICATE OF CORRECTION

Patent No. 4,031,556          Dated June 21, 1977

Inventor(s) ITSUKI BAN ET AL

It is certified that error appears in the above-identified patent and that said Letters Patent are hereby corrected as shown below:

```
Column  3, line  3, change "cylinder" to --cylindrical--.
Column  6, line  6, change "with" to --With--;
           line 65, change "motor 4" to --motor 84--.
Column  7, line 33, after "minimum" insert --radius--.
Column 10, line  1, change "86d" to --86b--.
Column 14, line 16, after "above" insert --that--.
Column 15, line 31, change "40" to --49--;
           line 64, after "taken" insert --up--;
           line 68, delete "to".
Column 18, line 60, after "reproducing," insert --recording,--.
Column 19, line 49, after "lever" insert --159--.
Column 20, line 36, after "roller" insert --92--.
Column 21, line 32, after "sion" insert --of--.
```

Signed and Sealed this

Thirteenth Day of December 1977

[SEAL]

Attest:

RUTH C. MASON          LUTRELLE F. PARKER
*Attesting Officer*      *Acting Commissioner of Patents and Trademarks*

UNITED STATES PATENT OFFICE
CERTIFICATE OF CORRECTION

Patent No. 4,031,556  Dated June 21, 1977

Inventor(s) Itsuki Ban, et al

It is certified that error appears in the above-identified patent and that said Letters Patent are hereby corrected as shown below:

Column 26, line 3, change "claim 1" to read --claim 21--.

Signed and Sealed this

Second Day of May 1978

[SEAL]

Attest:

RUTH C. MASON
Attesting Officer

LUTRELLE F. PARKER
Acting Commissioner of Patents and Trademarks